Jan. 25, 1966  N. KRASSOPOULOS  3,230,823
EASEL FOR PRINTING A PLURALITY OF PHOTOGRAPHS
Filed July 6, 1964  2 Sheets-Sheet 1

INVENTOR.
NICHOLAS KRASSOPOULOS
BY James P. M. Andrews

ATTORNEY

Jan. 25, 1966     N. KRASSOPOULOS     3,230,823
EASEL FOR PRINTING A PLURALITY OF PHOTOGRAPHS
Filed July 6, 1964     2 Sheets-Sheet 2
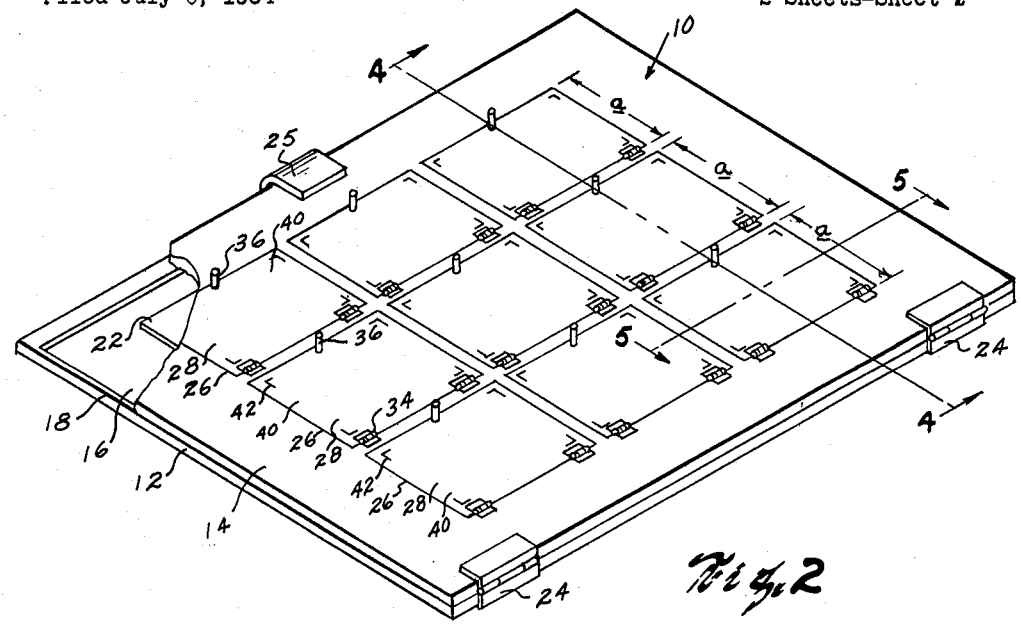
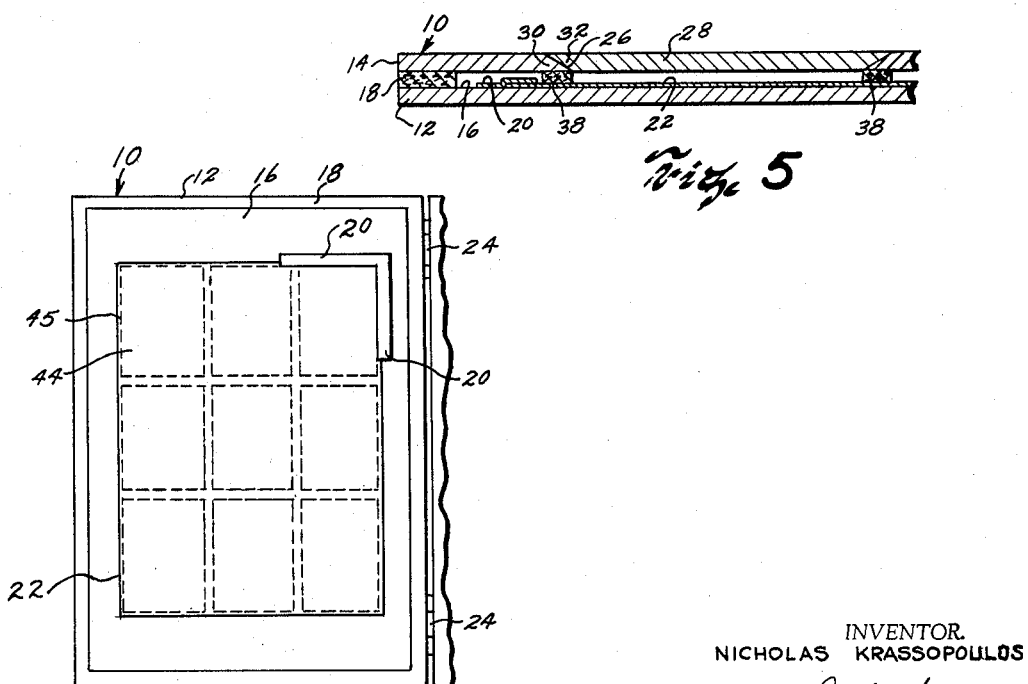
INVENTOR.
NICHOLAS KRASSOPOULOS
BY James P. McAndrews
ATTORNEY

United States Patent Office 3,230,823
Patented Jan. 25, 1966

3,230,823
EASEL FOR PRINTING A PLURALITY OF PHOTOGRAPHS
Nicholas Krassopoulos, Worcester, Mass.
(161 Morris St., Southbridge, Mass.)
Filed July 6, 1964, Ser. No. 380,697
6 Claims. (Cl. 88—24)

The field of this invention is that of photography and the invention relates more particularly to a novel and improved easel for use in printing a plurality of photographs.

In conventional processes for making positive photographic prints, a photographic negative is mounted in a projector or enlarger for projecting a photographic image in a selected focal plane. Photographic printing paper is then supported in this focal plane and positive images are printed upon the paper or portions of the paper. Ordinarily a mask is positioned above the photographic paper to define the portion of the paper upon which the positive photographic print is to be made and to prevent light from the projector or enlarger from falling upon other portions of the paper. Where a large number of positive prints of the same size are to be made in very large photographic printing establishments, elaborate apparatus is sometimes employed for automatically aligning the printing paper beneath the projector mask and for coordinating this alignment with projection of the photographic image by the projector enlarger, thereby to achieve speed and efficiency in printing and to effect maximum use of the printing paper. However, where elaborate apparatus of this sort is not warranted, as in small establishments where only a small number of prints of a particular size may be made at one time, movement of the printing paper is usually done manually and alignment of the paper with the projector mask is usually accomplished by visual means. As a result, the printing is slow and inefficient and less than the maximum possible number of positive prints is usually made on each sheet of photographic printing paper.

It is an object of this invention, to provide novel and improved means for making a plurality of positive photographic prints on a sheet of photographic printing paper with speed and efficiency and with maximum use of the printing paper; to provide an easel for accommodating standard-sized sheets of photographic printing paper which can be conveniently used for making the maximum possible number of positive photographic prints on said paper; to provide such an easel which is of simple, inexpensive and rugged construction; and to provide such an easel which can be rapidly and conveniently manipulated for making positive photographic prints with speed and economy.

Briefly described, the novel and improved easel provided by this invention includes a first plate for mounting a sheet of photographic printing paper and a second plate covering the first plate for excluding ambient light from the paper. In accordance with this invention, the second plate has a plurality of apertures through which light can be directed to be focused upon respective portions of the printing paper and each aperture has its own separate closure or door. In a preferred embodiment of this invention, light-sealing means extend around each aperture between the two plates. These sealing means comprise strips of felt, velvet or the like adhered to the second plate and are adapted to engage the photographic printing paper for holding the paper flat on the first plate and for precisely defining the portion of the paper which can be exposed to light through any one aperture.

In using such an easel, the easel is mounted on a support in the focal plane of a projector or enlarger and is moved about on the support so that the various easel apertures are aligned with the projector in sequence. Preferably the support is marked with a series of indicia with which the easel can be aligned in sequence for facilitating this positioning of the easel. As each easel aperture is aligned with the projector, the door or other closure for that aperture is temporarily removed for permitting printing of that portion of the photographic paper which is exposed through the aperture. As this is done, the other aperture closures remain in place for excluding light emitted by the projector and other ambient light from all other portions of the paper. In this way a plurality of photographs can be conveniently and rapidly printed upon a single sheet of photographic printing paper. In addition, the easel apertures can be located relative to each other and to the printing paper in such a way that maximum use can be made of the printing paper.

Other objects, advantages and details of preferred embodiments of this invention appear in the following detailed description of the invention, the detailed description referring to the drawings in which:

FIG. 2 is a perspective view to enlarged scale showing construction of the easel of FIG. 1;

FIG. 3 is a partial plan view showing the easel in open position;

FIG. 5 is a section view along line 5—5 of FIG. 2.

Figure 1:
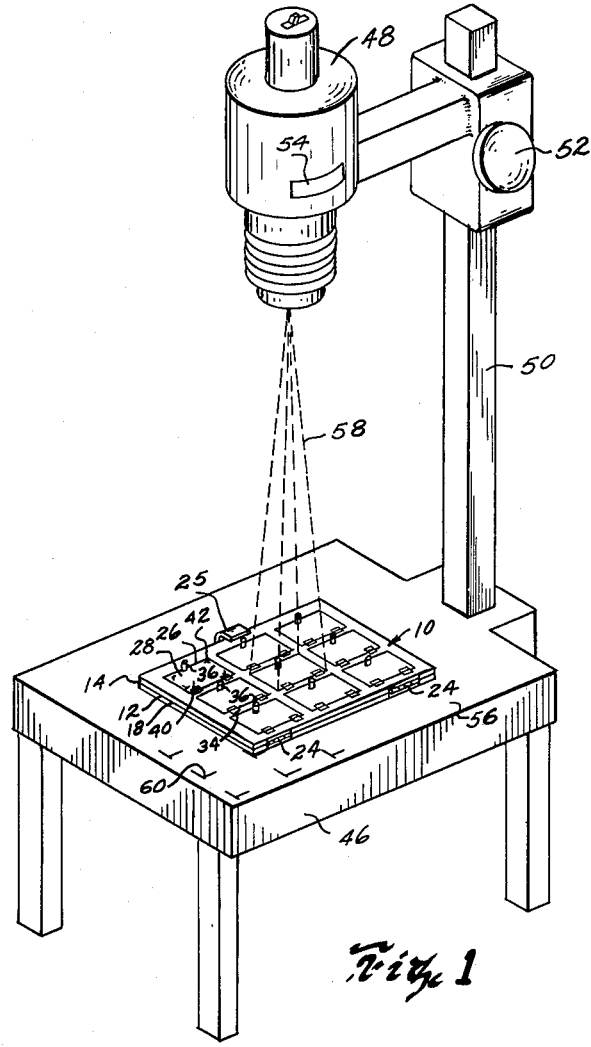
FIG. 1 is a perspective view diagrammatically illustrating use of the easel provided by this invention.

Referring to the drawings, 10 in FIGS. 1–5 illustrates the novel and improved easel provided by this invention which is shown to include a first or base plate 12 and a second or top plate 14. These plates can be formed of metal or plastic or any other relatively stiff material. The first plate preferably has a white or light-colored upper surface 16 and has a thin strip 18 of felt, velvet, rubber or similar material cemented to the plate for forming a light-seal extending around the periphery of the plate as shown in FIG. 3. The first plate also has two thin strips 20 of plastic or metal material or the like which are securely attached to the plate 12 to form a corner for locating a sheet of photographic printing paper 22 in a selected position on the first plate. If desired, these strips 20 can be lightly resilient and can be attached to the plate only along one edge of the strips for gripping the edge of the paper 22 inserted under the strips as shown in FIG. 5.

The second or top plate 14 has hinges 24 which attach the top plate to the base plate along one edge so that the top plate is positively located relative to the baseplate but can be lifted for permitting insertion or replacement of the photographic paper 22. When the top plate is disposed in covering relation to the base plate and engages the light-sealing means 18 extending around the periphery of the base plate as shown in FIG. 2, the top plate serves to exclude ambient light from the photographic paper 22 as will be understood. Alternatively, another strip of light-sealing means on the plate 14 could fit against the strip 18 for achieving better light-sealing. If desired, a resilient latch 25 can fit around and detachably hold the plates 12 and 14 in the closed position shown in FIG. 2.

Figure 4:
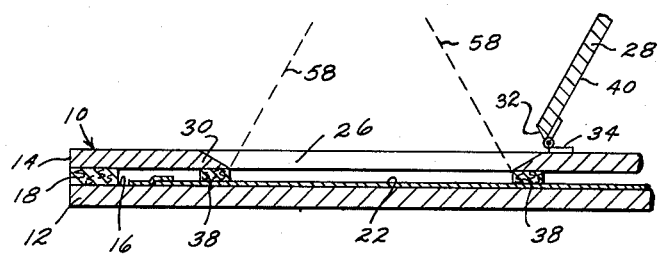
FIG. 4 is a section view along line 4—4 of FIG. 2.

In accordance with this invention, the top plate 14 has a plurality of rectangular apertures 26 and each aperture is provided with its own separate door 28 or other closure means. Preferably as shown in FIG. 4, each aperture 26 in the plate is tapered as at 30 and its door has a matching taper 32 so that the door forms a light-tight seal around its edge. Each door is also hinged to the plate 14 as at 34 and has a handle 36 for lifting the door. In addition, a thin strip 38 of felt or the like is attached to the plate 14 around each of the openings 26. As shown in FIGS. 4 and 5, this strip of material bears against the photographic paper 22 for holding the paper flat on the base plate 12 and also precisely defines the portion of the printing paper which can be exposed to view through each opening. Preferably the upper surface 40 of each door is white or light-colored and indicia 42 on the door serve to outline the size of the plate openings 26.

In a practical embodiment of this invention, each of the plates 12 and 14 is of 11 x 14 inch dimensions and the resilient strips 20 are adapted to locate a standard-size 8 x 10 inch sheet of photographic paper 22 on the plate 12 inside the light-seal 18. The plate 14 is provided with nine openings 26 which are each of $2^{13}/_{32}$ x $3^{5}/_{64}$ inch dimensions and which are arranged in three rows of three openings each with the $2^{13}/_{32}$ inch dimensions $a$, as shown in FIG. 2, extending side-by-side in said rows. The apertures can be spaced ¼ inch apart in each row and between rows. In addition, the openings 26 can be located in the plate 14 relative to the paper 22 so that, the apertures 26 can define respective portions 44 of the photographic paper outlined by the broken lines 45 in FIG. 3 which can be exposed to light for printing photographs thereon. In this way, the selected spacing of the plate apertures 26 serves to divide the photographic paper 22 to permit printing of the maximum number of wallet-sized photographs each with at least a ⅛ border all around on a standard-size sheet of photographic paper. The paper can then be cut with a single cut between the photographs with maximum speed and efficiency without wasting any of the paper.

In accordance with this invention, the easel 10 is placed upon a table or support 46 and a conventional photographic projector or enlarger 48 is mounted on a suitable standard 50. As indicated by the knob 52, the projector is adapted to be raised or lowered on the standard so that a photographic image from a negative (not shown) mounted on a slide 54 can be projected in a selected focal plane. As the projector and its function are well known it will not be described further herein and it will be understood that the projector can focus a photographic image in a focal plane generally defined by the upper surface 56 of the table 46.

When a negative print is mounted in the slide 54, one door 28 in the easel is opened and the projector is adjusted for focusing a photographic image on the white upper surface 16 of the base plate through this door opening. The easel is then removed, a sheet of photographic paper 22 is mounted in the easel and the easel is returned to the table with all of the doors 28 in closed position. The easel is then aligned with the projector so that the projected image falls upon the white upper surface 40 of a door 28 as indicated by the broken lines 58 in FIG. 1 and so that the portion of the image desired to be printed is outlined by the indicia 42 on the door. This door is then opened and, as indicated by the broken lines 58 in FIG. 4, the projector prints the outlined portion of the photographic image on the portion of the paper 22 defined by the opening 26. This door is then closed and the other doors are aligned etc. in sequence until one photograph has been printed through each plate opening 26. This can be rapidly and conveniently accomplished, and, if desired, indicia 60 marked on the table 46 and adapted to be aligned with a corner of the easel 10 can be used for facilitating alignment of the easel with the projector. If desired these indicia 60 can be printed upon a separate sheet of cover paper or the like (not shown) which can be rested on the table 46. In this way, different sheets of paper could be provided for use with different easels 10.

In other practical embodiments of this invention, the plate 14 can be provided with twelve rectangular apertures 26 of $2^{13}/_{32}$ x 2¼ inch dimensions arranged in four rows of three apertures each, the apertures being spaced ¼ inch apart in each row and apart between rows, thereby to print twelve passport size photographs on a single sheet of photographic printing paper 22 each with at least a ⅛ inch border all around.

Alternatively, the plate 14 can be provided with six rectangular apertures of $3^{5}/_{64}$ x 3¾ inch dimensions arranged in three rows of two apertures each with said 3¾ inch dimensions extending side-by-side in said rows, said apertures being spaced ¼ inch apart in each row and between rows, thereby to print six miniature size photographs in a single sheet of photographic paper 22.

In another alternative embodiment of this invention, the plate 14 can be provided with four rectangular apertures of 3¾ x 4¾ inch dimensions arranged in two rows of two apertures each with the 4 inch dimensions extending side-by-side in said rows, said apertures being spaced ¼ inch apart in each row and ¼ inch apart between rows, thereby to print four larger 4 x 5 inch photographs on a single sheet of photographic paper 22 each with a ⅛ inch border all around.

Using easels of these constructions, it is possible to print useful quantities of various standard-size photographs very rapidly with substantially no waste of photographic paper. For example, an operator can print twelve passport photographs in 58 seconds, can print nine wallet size photographs in 40 seconds, can print six miniature photographs in 30 seconds, and can print four 4 x 5 inch photographs in 22 seconds.

It should be understood that although particular embodiments of this invention have been described by way of illustration, this invention includes all modifications and equivalents thereof which fall within the scope of the appended claims.

I claim:

1. An easel for printing a plurality of photographs comprising a base plate, means mounting a sheet of photographic printing paper in a selected location on said base plate, a second plate hinged to said base plate along one edge so that the second plate can be raised for inserting said paper on said base plate and can then be disposed in predetermined overlying relation to said paper, strips of light-sealing material extending around said paper between said plates for excluding ambient light from said paper, said second plate having a plurality of spaced apertures aligned with said paper through which light can be focused upon respective portions of said paper, said second plate having strips of light-sealing material extending around each of said apertures to engage said paper when said second plate is disposed in overlying relation to said paper for limiting the portion of said paper which can be exposed to said focused light through each of said apertures, each aperture having a closure which can be removed to permit printing of a photograph upon a respective portion of said paper and which can be replaced for excluding light from said paper portion during printing of photographs upon other portions of said paper.

2. An easel as set forth in claim 1 in which said base plate mounts an 8 x 10 inch sheet of photographic paper and in which said second plate has twelve rectangular apertures of $2^{13}/_{32}$ x 2¼ inch dimensions arranged in four rows of three apertures each, said apertures being spaced ¼ inch apart in each row and between rows, said group of apertures being centrally aligned over said paper with said rows extending along said 8 inch dimension of said paper.

3. An easel as set forth in claim 1 in which said base plate mounts an 8 x 10 inch sheet of photographic paper and in which said second plate has nine rectangular apertures of $2^{13}/_{32}$ x $3^{5}/_{64}$ inch dimensions arranged in three rows of three apertures each with said $2^{13}/_{32}$ inch dimensions extending side-by-side in said rows, said apertures being spaced ¼ inch apart in each row and between rows, said group of apertures being centrally aligned over said paper with said rows extending along said 8 inch dimension of said paper.

4. An easel as set forth in claim 1 in which said base plate mounts an 8 x 10 inch sheet of photographic paper and in which said second plate has six rectangular apertures of 3 59/64 x 3 3/4 inch dimensions arranged in three rows of two apertures each with said 3 3/4 inch dimensions extending side-by-side in said rows, said apertures being spaced 1/4 inch apart in each row and between rows, said group of apertures being centrally aligned over said paper with said rows extending along said 8 inch dimension of said paper.

5. An easel as set forth in claim 1 in which said base plate mounts an 8 x 10 inch sheet of photographic paper and in which said second plate has four rectangular apertures of 3 3/4 x 4 3/4 inch dimensions arranged in two rows of two apertures each with said 3 3/4 inch dimensions extending side-by-side in said rows, said apertures being spaced 1/4 inch apart in each row and between rows, said groups of apertures being centrally aligned over said paper with said rows extending along said 8 inch dimension of said paper.

6. An easel for printing a plurality of photographs on a single sheet of photographic paper, said easel comprising a base plate having a light-colored surface, means mounting a sheet of photographic printing paper in a selected location on said base plate surface, a second plate hinged to said base plate along one edge so that the second plate can be removably displosed in overlying relation to said paper, sealing means extending around said paper between said plates for excluding ambient light from said paper, said second plate having a plurality of apertures aligned with said paper through which light can be focused upon respective portions of said paper, said second plate having sealing means around each of said apertures to engage said paper for limiting the portion of said paper which can be exposed to said focused light through each of said apertures, said plate apertures having walls which taper outwardly from said paper, each aperture having a door tapered to fit snugly into said aperture, each door being hinged to said second plate along one edge of said door so that the door can be opened to permit printing of a photograph upon a respective portion of said paper and so that said door can be closed for excluding light from said paper portion during printing of photographs upon other portions of said paper, each of said doors having a light-colored surface exposed to view when the door is in closed position and having indicia on said surface indicating the outline of said paper which can be exposed to said focused light through said aperture when the door is in open position.

References Cited by the Examiner

UNITED STATES PATENTS 2,895,377   7/1959   Manning _____ 88—24

FOREIGN PATENTS 1,052,713   9/1953   France.

NORTON ANSHER, *Primary Examiner.*

R. A. WINTERCORN, *Assistant Examiner.*